INVENTOR
Giovanni Bonmartini

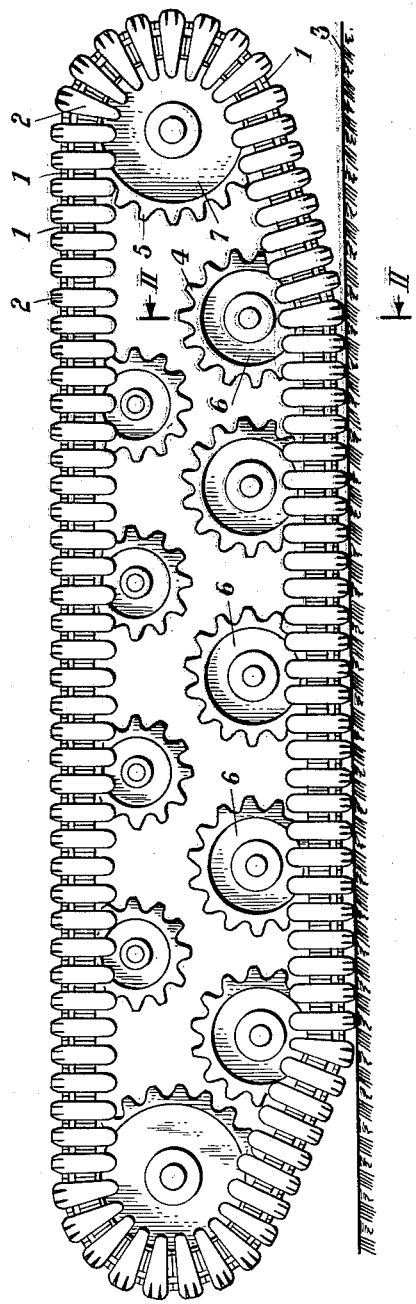

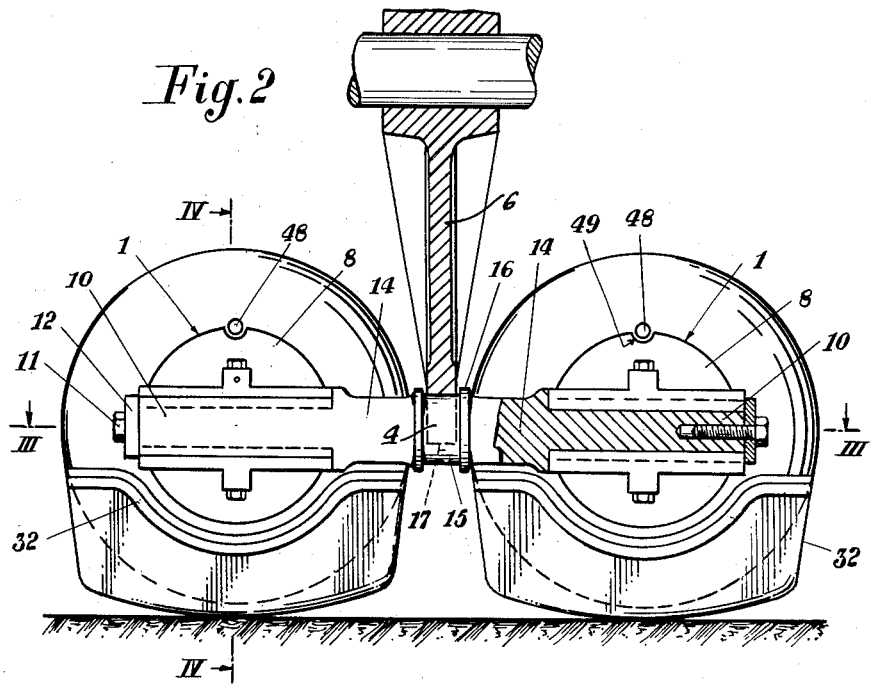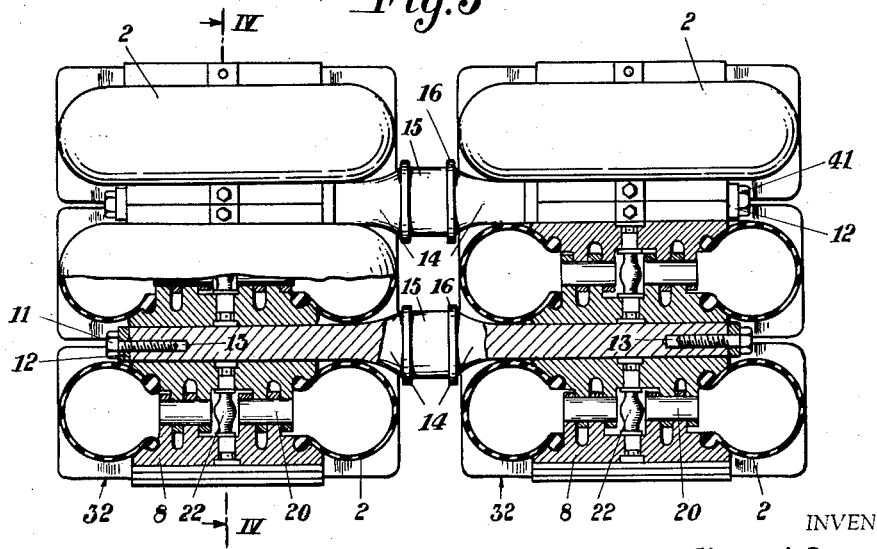

BY *Robert E. Burns*

ATTORNEY

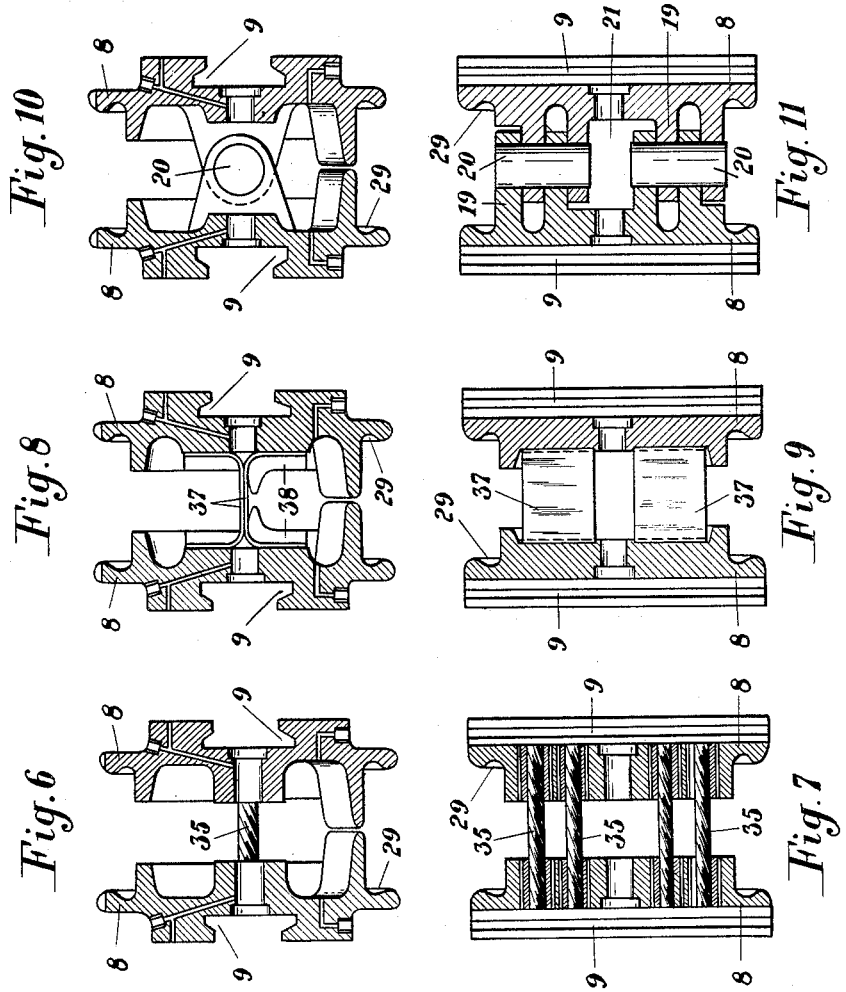

Aug. 25, 1964 G. BONMARTINI 3,146,035
PNEUMATIC TRACK DEVICE FOR TRACK LAYING VEHICLES
Filed Aug. 15, 1962 7 Sheets-Sheet 5

INVENTOR
Giovanni Bonmartini

BY *Robert E. Burns*
ATTORNEY

Aug. 25, 1964 G. BONMARTINI 3,146,035
PNEUMATIC TRACK DEVICE FOR TRACK LAYING VEHICLES
Filed Aug. 15, 1962 7 Sheets-Sheet 6

INVENTOR
Giovanni Bonmartini
BY Robert E. Burns
ATTORNEY

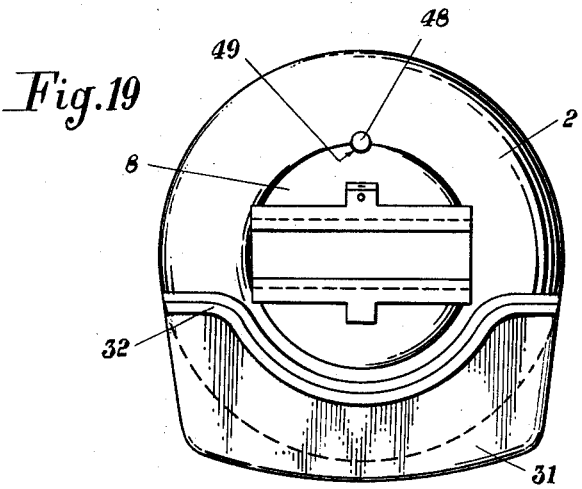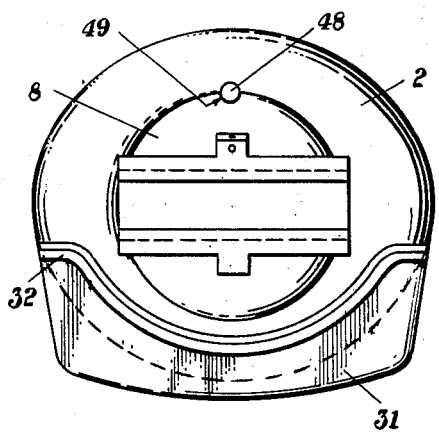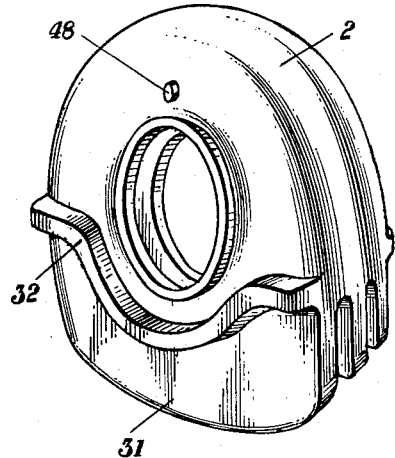

United States Patent Office 3,146,035
Patented Aug. 25, 1964

3,146,035
PNEUMATIC TRACK DEVICE FOR TRACK
LAYING VEHICLES
Giovanni Bonmartini, 2 Via S. Teodoro, Rome, Italy
Filed Aug. 15, 1962, Ser. No. 217,064
Claims priority, application Italy Feb. 24, 1962
6 Claims. (Cl. 305—11)

An object of this invention is a vehicle track device for a track laying consisting of rigid elements connected to one another by joints protected against the harmful action of deleterious agents for example, sand, mud, water and the like.

Another object of this invention is a track device wherein the protective means for the joints are able to form the rest and spring means for the track on the ground.

It is known that the normal metal track for vehicles consists of an endless chain of rigid elements called links, articulated by pairs by a hinged joint device. Almost in all the structures marketed and used, the joint device comprises bored extensions located at both ends of each link, coupled to the corresponding bored extensions of the adjacent links by means of a cylindrical pin or gudgeon around which said extensions, and of course also the associated links, can move angularly.

The metal tracks, when so constituted, lack inherent elasticity, and therefore they are quite noisy when travelling on a road. They damage the road surface, and are subject to excessive wear and breakages due to the action of external agents, particularly when travelling off of a road it being understood that it is off the road travel which justifies the use of the tracks. In known track devices friction resistance consumes much of the motive power of the vehicle, since the pin joints cannot be lubricated because the lubricating oil kneads with the minute dust and ground particles and increases the abrasive action thereof thereby decreasing the useful average life of the track. Another drawback of metal track devices is that not only are they very noisy but also, due to their rigidity, they limit the speed of the vehicle on which they are mounted.

The present invention obviates these drawbacks of the presently used metal tracks and provides protection for the joints inserted between the links of a metal track so as to keep the advantages inherent to the track, for example strength capability of being used in different terrains simplicity, and further providing the joints ideal conditions of operation by protected against external agents and providing the possibility of lubrication.

According to the invention, each joint of the track is protected by a flexible and impermeable cover or envelope, which although allowing the mutual angular movement of the single rigid links of the track, prevents any foreign matter such as water, dust, sand, mud, stones from coming into contact with the joint, and damaging the structure of the track.

This protective envelope or cover allows also, if desired lubrication of the joint pins with a consequent increase of the smoothness of operation of the track.

Also, according to the invention, in the joint bushings with antifriction metal, or roller bearings, ball bearings, needle bearings and the like can be used. The track devices of the invention will operate even when well used, with the same efficiency as when they are operated on a test bench.

According to the invention the flexible and impermeable covers can be formed by tires or pneumatic chambers similar to the common tires for motor vehicles of the tubeless type i.e. of the type where an inward open toroidal wall sealingly rests on channels of a rigid support such as a metal rim and wherein the inflating or deflating valve could be directly applied to the rigid support.

In this case the result is that the pneumatic chamber will be utilized, for ensuring for the joint, and also as an elastic rest on the ground. Thus a double function will be attained, i.e. of having a track with joints which are entirely protected against the action of abrasive and deleterious agents and an elastic unit, well adherent to the ground even if the ground is irregular, and the device is capable of running at high speed, on paved road or off the road and is able to operate with one or more deflated tires.

According to this invention, the pneumatic chambers can be interchangeable with one another and are quickly and individually mountable or dismountable and replaceable in case of damages.

The pneumatic chambers can be inflated singularly or collectively, while the deflation can be obtained individually.

This invention is shown in certain preferred embodiments in the attached drawings wherein:

FIG. 1 is a side elevation view of a track device mounted on toothed wheels;

FIG. 2 is a vertical cross-sectional view, with some parts in elevational view, taken along the line II—II of FIG. 1;

FIG. 3 is a horizontal view partly in section taken along the line III—III of FIG. 2;

FIGS. 6, 8 and 10 are vertical cross-sectional views of three different embodiments of articulated joints;

FIGS. 7, 9 and 11 are horizontal cross sectional views of the same embodiments of an articulated joint as FIGS. 6, 8 and 10 respectively;

FIG. 19 is a front elevation view of a pneumatic cover, mounted on a joint and track link element, according to the invention;

FIG. 20 is a front elevation view of the cover of FIG. 19, and

FIG. 21 is a perspective view of the pneumatic cover of FIG. 19.

Figure 4:
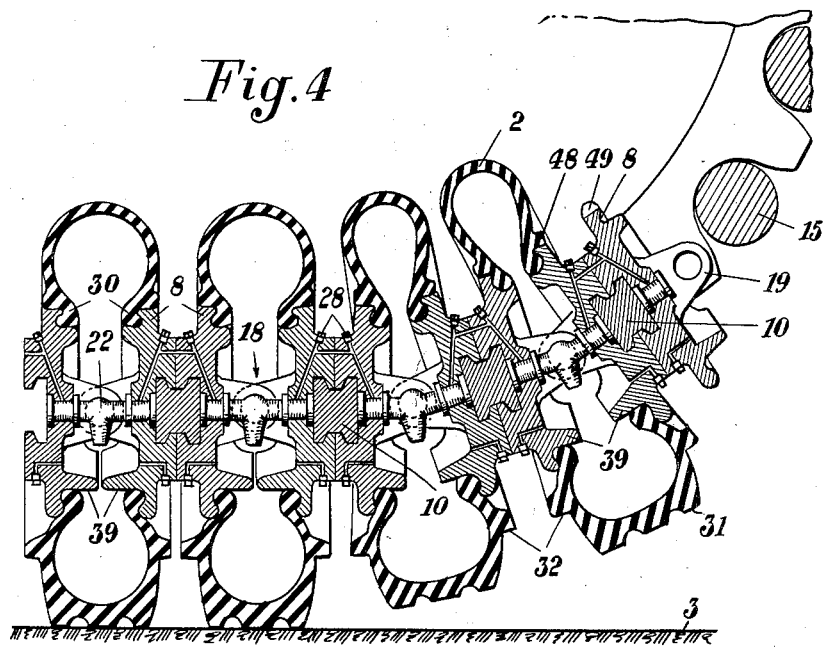
FIG. 4 is a vertical cross-sectional view taken along the line IV—IV of FIGS. 2 and 3.

According to an embodimeat of the invention the track device comprises a continuous chain the links 1 of which (FIG. 1) are connected by means of hinged or flexible joints enclosed within flexible and impermeable covers or envelopes 2, forming members O for resting on the ground 3. The links 1 engage the teeth 4 and 5, respectively, of toothed wheels 6 and 7 respectively, which in turn are mounted on a track laying vehicle not shown.

Figure 5:
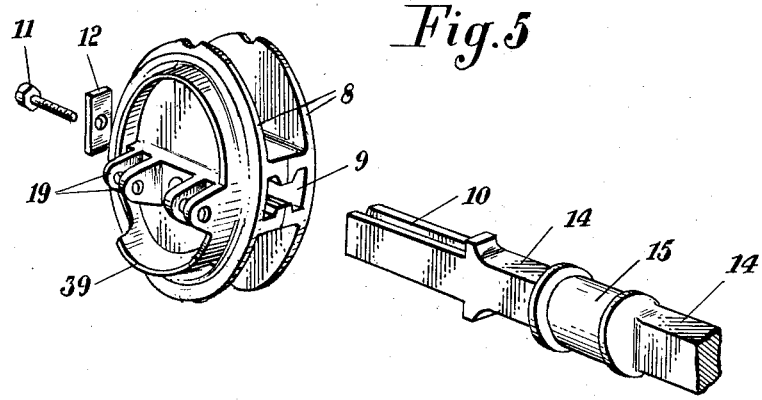
FIG. 5 is an exploded perspective view of a rigid link of the track with its support and certain constructive details.

In FIGS. 2, 3 and 4 has been shown an embodiment with pneumatic sleeves coupled two by two, so as to form a double track co-operating with a single set of wheels 6 and 7 respectively, all located in the same vertical plane. Each link 1, shown in partially exploded perspective view in FIG. 5, comprises two dish shaped elements 8 each provided with a diametrical groove 9 which when the elements 8 are disposed next to each other, as shown in FIG. 5, form a channel having a X-shaped cross-section to receive a correspondingly shaped prism 10 which may be slightly tapered, so as to hold the disk elements tightened against one another.

A bolt 11 having a suitable washer 12, FIGS. 2 and 3, engages a threaded axial recess 13 of the prism 10 connecting thus firmly and rigidly the above mentioned parts (8, 8, 10, 11, 12) which in their unit form the link 1.

FIGS. 2 and 3 show that a single cross member 14 carries at its ends two prisms 10, 10 and in its central zone a cylindrical portion or pin 15 confined by annular projections or collars 16, 16. The cylindrical portion cooperates with the teeth 17 of the toothed wheel 6.

In order to better understand the structure and the operation of the rigid links 1 of the track according to this invention, reference is to be made to FIG. 4 where is shown a sequence of links connected by pin joints 18 and forming together a chain suitable to cooperate by its pins 15 with the toothed wheels 6 and 7, FIGS. 1, 2 and 4.

Figure 12:
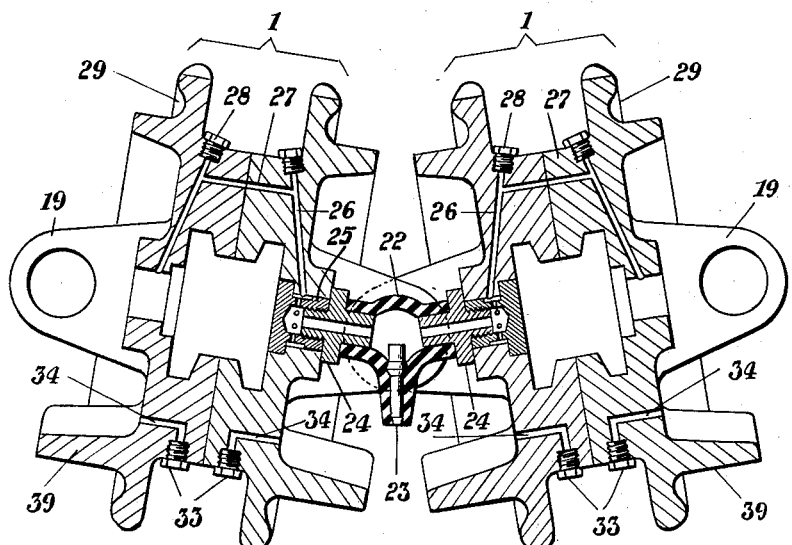
FIG. 12 is a sectional view on an enlarged scale of a detail of FIG. 4.
Figure 13:
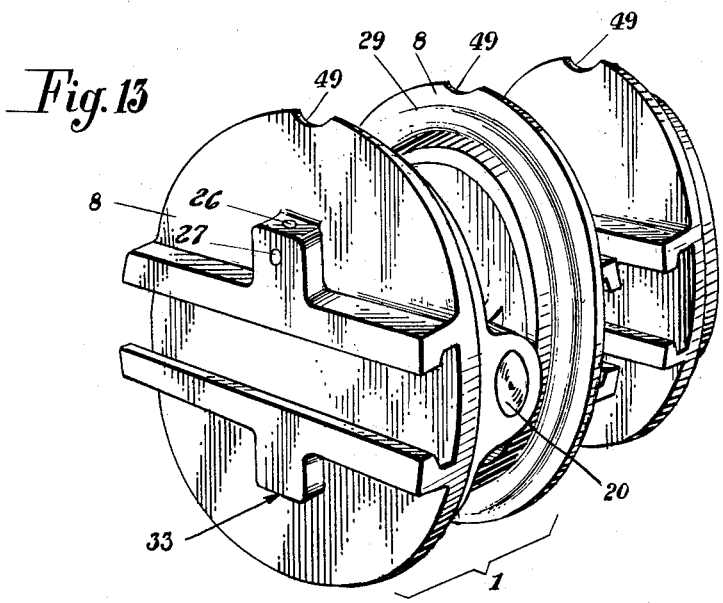
FIG. 13 is a perspective view of a sequence of three link elements two of which are connected to one another by a pin, while the third element is somewhat spaced apart.

Between each pair of links 1, 1 is interposed an articulated joint, which in FIGS. 2, 3, 4, 10, 11 and 13 consists of a pin hinge, wherein extensions 19, coaxially bored engage a cylindrical pin 20 in turn consisting of two independent co-axial sections between which a recess 21 is left to receive a flexible fitting, preferably consisting of a rubber pipe or tube 22 carrying an inflating valve 23 and connected by bushings 24 and plugs 25 to ducts 26, 27 provided within the bodies of the elements 8, FIG. 12. The ducts 26 are closed at one end by the plugs 28, while the ducts 27 of a link are mutually connected in an air tight manner. Within grooves 29 provided in each dish element 8, at the outside with respect to each link 1, are engaged the heels 30 of the pneumatic sleeves 2. The sleeves thus cooperate with two successive dish elements 8, of two different links 1, protect in an air-tight chamber the articulated hinge 19, 20 allowing its operation in an easy way by lubrication due to the material of the bushings and of the pins, or by a fluid lubricant shielded against water, mud, sand and so on.

The FIGS. 19, 20, and 21 show an embodiment of a pneumatic sleeve particularly suitable to the operation as a rest member on varied terrain. The sleeve is provided, at the sole outer part, which comes into contact with the ground, with a tread 31 and preferably with side ribs 32 having the purpose of forming an auxiliary rest or support on the ground if the latter is soft for example in mud.

As shown in FIGS. 3 and 4, the sequence of the ribs 32 forms, in the straight portions of the track, almost a continuous surface, as the ribs come substantially into contact with one another. The tire 2 comprises projections 48 engaged into notches 49 of the dish elements 8 to prevent the dish elements from rotating with respect to one another.

Each chamber for compressed air, consisting of a sleeve 2 and the dish elements 8 which cooperate therewith, is provided with deflation valves 33 controlling the ducts 34 provided within the body of the dish elements 8. Thus the inflation of all sleeves 2 of a single sequence of track can be obtained simultaneously and under a uniform pressure, by introducing the compressed air through any of the aforesaid plugs 28 while each sleeve can be individually deflated by one of the valves 33 provided therein.

Instead of the hinged joint hereinbefore described, it is possible to adopt an inextensible and flexible connection as shown in FIGS. 6-7 and 8-9, respectively.

Figure 18:
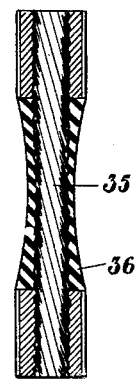
FIG. 18 is a sectional view on an enlarged scale of a coated metal rope forming the flexible joint of FIGS. 6 and 7.

In FIGS. 6 and 7 between two successive dish elements 8 are interposed elements of metal rope 35 firmly anchored to the dish elements. The rope elements can be coated with rubber as shown at 36 in FIG. 18.

In FIGS. 8 and 9 four steel tapes 37 are fixed to the dish elements 8 and are guided by arc shaped sectors 38 rigid with the dishes.

In FIGS. 4, 6, 8, 10 and 12 it can be noted that each dish element 8 is provided with a projection 39 cooperative with a corresponding projection carried by the next dish element 8 in the same inner chamber of a pneumatic sleeve 2, in order to prevent any arc shaped deflection of the portion of the track in contact with the ground, through the intervals between the carrier wheels 6, FIGS. 1 and 4.

Figure 14:
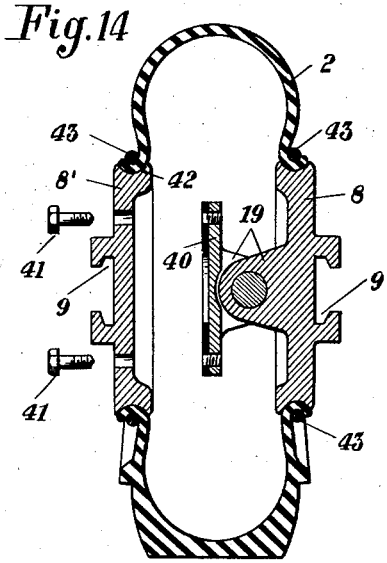
FIGS. 14 and 15 are vertical cross-sectional views of two assembly positions of a pin joint with a pneumatic sleeve fasted to its supports by means of tightening rings.
Figure 15:
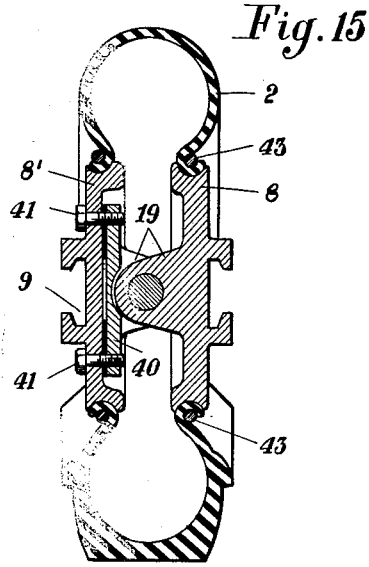

In FIGS. 14 and 15 is shown, by way of example, another embodiment wherein two successive dish elements 8 and 8' of a same link are not identical to one another, similar to the previously described embodiments, but are different in that the bush projections 19 of the dish element 8' are carried by a counter-plate 40 which is connected to the dish element 8' by bolts 41.

Figure 16:
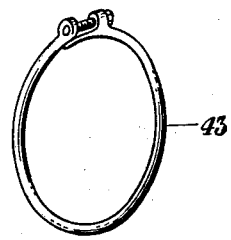
FIG. 16 is a perspective view of a ring used in the embodiment of FIGS. 14 and 15.
Figure 17:
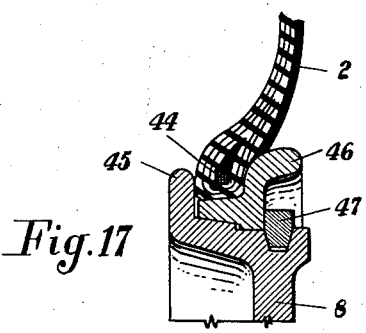
FIG. 17 is a fragmentary sectional view of a detail of a different embodiment of the coupling between the pneumatic sleeve and the two rigid parts mutually apt to oscillate, of a two link joint.

This arrangement allows the sleeve 2 to be mounted and dismounted without dismantling the adjacent links of the track. The links are spaced apart from one another only through the distance serving for the passage of the sleeve 2 between the dish element 8' and the counter-plate 40. In this embodiment the pneumatic sleeve 2 is preferably fastened and sealingly held in grooves 42—42 by means of tightening rings 43 as illustrated in FIG. 16.

The device can be provided with different means for fastening the heels 44 of the sleeve 2 to the edge 45 of the plate 8 consisting of a ring 46 and a fastening ring 47 of the type widely used for motor car wheels in the years following the First World War.

In the preceding disclosure there have been illustrated three preferred embodiments of the track forming the object of the present invention, together with certain changes of details, it being however understood that other embodiments will come within the field covered by the present invention and particularly reference is made to a track embodiment consisting of a simple sequence of links and pneumatic sleeves, instead of a double sequence as illustrated, FIGS. 2 and 3. The invention can make use of pneumatic sleeves, of common pneumatic tires of the type commercially called "tubeless tires" for automobiles.

Further a track comes within the field of coverage of the present application wherein the protective sleeves for the joints are of the so-called "solid tire" type for motor vehicles, i.e. are not inflated by compressed air, offering on the contrary an elasticity due to features of shape and material.

The field of coverage of the invention includes protective cover for the joint consisting of corrugated flexible material, for instance a steel sheet. The sleeves may form the rest members on the ground. Further within the field of coverage of this invention will come chain metal tracks wherein the single links are provided with rotatable rollers for resting on the ground, the rollers having their axes located lengthwise with respect to the track.

According to the present invention a track is provided suitable for the most different uses from little vehicles to the big ones, and it ensures that in case of accidental deflation of one or more of the pneumatic sleeves, the entire track can continue operation ensuring the vehicle can keep travelling to its destination.

I claim:

1. In an endless track device for track laying vehicles which comprises, in combination, a plurality of paired, rigid, dish-shaped elements with successive ones of said pairs of dish-shaped elements spaced from one another longitudinally on said track device, means providing flexible, connecting joints between successive pairs of said dish-shaped elements, a plurality of inflatable, resilient, impermeable covers for protecting said flexible joints and disposed circumferentially of two respective dish-shaped elements spanning a space between two most adjacent dish-shaped elements of two successive pairs of said dish-shaped elements to protect said flexible joints, said covers having ground-engaging surfaces comprising treads, means on said covers and means on said elements to effect a fluid-tight seal between the respective cover and said dish-shaped elements on which a cover is mounted.

2. In an endless track device for a track laying vehicle which comprises, in combination, a plurality of paired, rigid, dish-shaped elements with successive ones of said pairs of dish-shaped elements spaced from one another longitudinally on said track device, means providing flexible, connecting joints between successive pairs of elements, a plurality of inflatable, resilient, impermeable covers for protecting said flexible joints and disposed circumferentially of two respective dish-shaped elements spanning a space between two most adjacent dish-shaped elements of two successive pairs of said dish-shaped elements to protect said flexible joints, said covers having ground-engaging surfaces for supporting said track device and said vehicle means on said covers and means on said elements to effect a fluid-tight seal between the respective cover and said dish-shaped elements on which a cover is mounted, means on said paired elements for inflating said covers mounted on said paired elements.

3. In an endless track device for a track laying vehicle having driving sprockets which comprises, in combination, a plurality of paired, rigid, dish-shaped elements with successive ones of said pairs of dish-shaped elements spaced from one another longitudinally on said track device, means connecting said paired dish-shaped elements comprising means connecting said paired dish-shaped elements as pairs disposed side-by-side on opposite sides of a longitudinal plane passing through said track device, means providing flexible, connecting joints between successive pairs of elements, a plurality of inflatable, resilient, impermeable covers for protecting said flexible joints individually and disposed circumferentially of two respective dish-shaped elements spanning a space between two most adjacent elements to two successive pair of dish-shaped elements on which said covers are mounted to protect said flexible joints, said covers having ground-engaging surfaces for supporting said track device and said vehicle means on said covers and means on said elements to effect a fluid-tight seal between the respective cover and said dish-shaped elements on which a cover is mounted, and means comprising check valves on said paired elements for inflating said covers mounted on said paired elements therethrough.

4. In an endless track device according to claim 3, in which the paired dish-shaped elements each have a T-groove disposed for defining an H-shaped channel jointly with a dish-shaped element of a respective pair, said means connecting said pairs of dish-shaped elements in pairs disposed side-by-side comprises a plurality of connecting members disposed transversely of said track device, said connecting members each comprising opposite end portions each having oppositely disposed grooves and shaped to be received in the said H-shaped channels of the two pairs of dish-shaped elements joined by a given connecting member, a plurality of means for releasably securing said opposite end portions of said connecting member with respective pairs of said dish-shaped elements.

5. In an endless track device according to claim 4, in which each of said connecting members comprises a portion intermediate the opposite edge portions thereof for cooperation with said driving sprockets for driving said track device therefrom.

6. In an endless track device according to claim 3, in which the paired dish-shaped elements each have a groove disposed for defining a channel jointly with a dish-shaped element of a respective pair, said means connecting said pairs of elements in pairs disposed side-by-side comprises a plurality of connecting members disposed transversely of said track device, said connecting members each comprising opposite end portions each having oppositely disposed grooves and shaped to be received in said channels of the two pairs of dish-shaped elements joined by a connecting member, a plurality of means for releasably securing said opposite end portions of said connecting member with respective pairs of said dish-shaped elements.

References Cited in the file of this patent

UNITED STATES PATENTS

| | | |
|---|---|---|
| 587,656 | Mann | Aug. 3, 1897 |
| 1,451,516 | Penn | Apr. 10, 1923 |
| 2,235,375 | Kraft | Mar. 18, 1941 |
| 2,254,787 | Aukland | Sept. 2, 1941 |
| 2,306,577 | Walker | Dec. 29, 1942 |
| 2,359,586 | Sayler | Oct. 3, 1944 |
| 2,416,679 | Curtis | Mar. 4, 1947 |
| 2,587,470 | Herzegh | Feb. 26, 1952 |
| 2,695,819 | Parsons | Nov. 30, 1954 |
| 2,751,259 | Bonmartini | June 19, 1956 |
| 3,089,738 | Steiner | May 14, 1963 |

FOREIGN PATENTS

| | | |
|---|---|---|
| 855,960 | Germany | Nov. 17, 1952 |